INVENTOR.
CHARLES A. JOY
BY Charles J. Ungemach
ATTORNEY

United States Patent Office 3,473,432
Patented Oct. 21, 1969

3,473,432
EXPANSIBLE FASTENER
Charles A. Joy, Richfield, Minn., assignor to Honeywell Inc., Minneapolis, Minn., a corporation of Delaware
Filed July 3, 1967, Ser. No. 651,041
Int. Cl. F16b 39/02, 37/00, 39/28
U.S. Cl. 85—9                                    3 Claims

ABSTRACT OF THE DISCLOSURE

A threaded nut or bolt in which the final tightening is achieved by expanding the shoulder with set screws. The nut or bolt includes a pair of spaced, flexible flange portions concentrically arranged about the axis thereof and being joined at their inner ends to a central post portion. The upper flange threadedly receives a plurality of set screws which are adapted to bear against the lower flange and spread the flanges apart in response to rotation of the set screws.

BACKGROUND OF THE INVENTION

In vacuum of high pressure devices it is often desirable to seal bolt holes therethrough so as to make them airtight. This can be done by placing an O-ring underneath the bolt head or the nut which screws on to the bolt. If the device is to be subjected to high temperatures the O-ring must be constructed of gold or other heat resistant material. Gold, however, is very fragile and the rotary screwing motion of a bolt or nut will tend to injure the O-ring so as to create an imperfect seal. Consequently, it is desirable to have a bolt or nut that can be tightened without the rotary motion. The present invention provides apparatus to achieve this result.

SUMMARY OF THE INVENTION

Briefly, the present invention involves forming two flanges on the nut or bolt so that set screws mounted in the upper flange can bear against the lower flange and force the two flanges to separate. The resultant expansion of the bolt head or nut serves to tighten it without any rotary motion. Consequently, it is an object of the present invention to provide an improved fastening device. It is a further object of my invention to provide an expandable fastening device which can be tightened without rotary motion. Other objects and advantages will become apparent to those skilled in the art upon consideration of the following description and drawings.

DESCRIPTION OF THE PREFERRED EMBODIMENT

Figure 1:
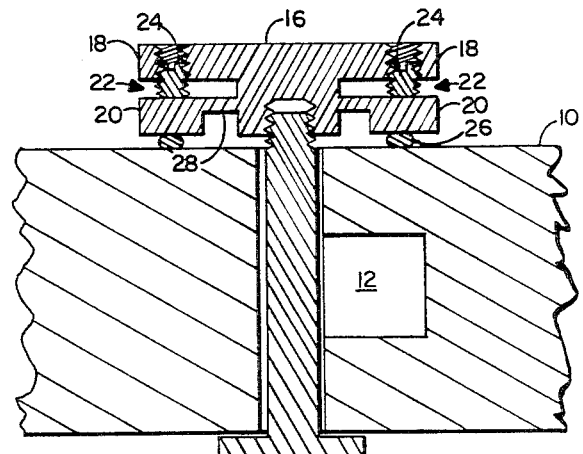
FIGURE 1 is a sectional view drawing of one embodiment of my invention.

In FIGURE 1 a block 10 is shown having a space therein, generally indicated by the numeral 12, and a bolt 14 passing therethrough. Since the hole for bolt 14 is in communication with space 12 the hole will have to be sealed at both ends in order to seal space 12. In FIGURE 1 only the upper portion involving the nut is shown in a sealed configuration. The configuration utilized for sealing the lower end will be described fully with respect to FIGURE 2.

In FIGURE 1 a nut or cap 16 is shown threaded onto bolt 14. Cap 16 has two generally circular flanges 18 and 20 which in actual practice would probably be formed by machining a deep groove or slot 22. A plurality of set screws 24 are mounted about the rim of flange 18. Only two of these set screws 24 are shown in FIGURE 1. In order to seal space 12 cap 16 is threaded onto bolt 14 until it just touches an O-ring 26. Then set screws 24 are screwed down through flange 18 against flange 20 so as to expand slot 22, flex flange 20, and compress O-ring 26 thus forming an airtight seal. In the embodiment shown in FIGURE 1 flange 20 is narrowed down by means of an annular groove 28 so that flange 20 is more easily flexed against O-ring 26.

Figure 2:
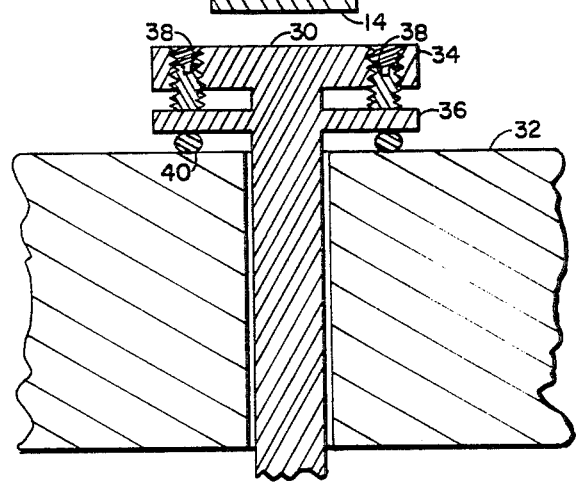
FIGURE 2 is a sectional view drawing of a second embodiment of the present invention.

The present invention may also be utilized in conjunction with the head as shown in FIGURE 2. A bolt 30 is positioned in a block 32. Bolt 30 has two flanges 34 and 36 formed thereon. In this embodiment the lower flange 36 has a constant thickness and is thin enough so that no annular groove is necessary to provide flexibility. As described with reference to FIGURE 1, a plurality of set screws 38 positioned about the rim of flange 34 may be screwed in so as to expand the head of bolt 30 and compress an O-ring 40.

Figure 3:
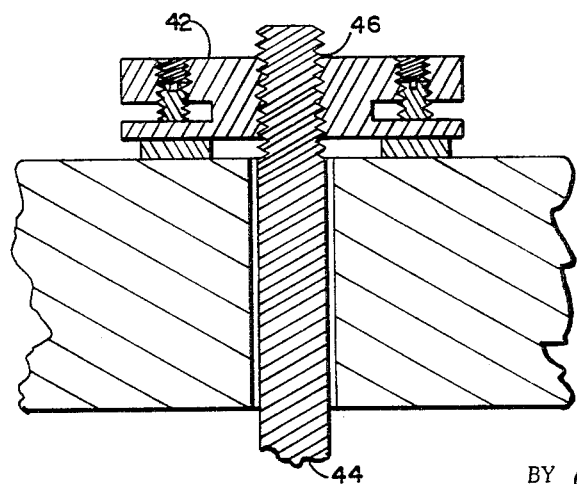
FIGURE 3 is a sectional drawing of a third possible embodiment.

As can be seen in FIGURE 3 the present invention may also be applied to a conventional type nut shown as a nut 42 threaded on a bolt 44. Because of leakage through the threads 46 this embodiment would not seal as completely as the embodiments of FIGURE 1 and FIGURE 2. However, this embodiment serves to show that my invention may be applied to any type of fastening device in which it is desired to have the final tightening process be a compressional one rather than a rotary one. In fact, the rotary motion may be eliminated completely. For example, nut 42 could be simply slid onto a threadless bolt and glued in place. When the glue is hard the final tightening may be achieved by means of the set screws. Thus, it is evident that various modifications may be made to the apparatus disclosed herein without departing from the spirit and scope of the invention. Consequently, I do not intend the present invention to be limited to the particular embodiment and apparatus shown in the drawings.

I claim:

1, A fastening device having means for engaging a mating member and being formed from a single piece of material, said fastening device having a longitudinal axis defining the tightening axis thereof with two flexible flange portions concentrically arranged thereabout and being joined at their radially inner ends to a central post portion, said flange portions being uniformly axially spaced apart with the adjacent surfaces thereof extending substantially normal to said axis, one of said flange portions operable to bear against an object which is to be fastened said flange portions operable to bend in opposite directions along said axis and a plurality of screw means threadedly received in symmetrically spaced apertures in the other of said flanges and adapted to bear against the adjacent surfaces of said one flange so as to separate said flange portions along said axis and thereby force said one flange toward the object to be fastened to tighten said fastening device.

2. The apparatus of claim 1 in which said fastening device comprises a nut.

3. The apparatus of claim 1 in which said fastening device comprises the head of a bolt.

(References on following page)

References Cited

UNITED STATES PATENTS

| | | |
|---|---|---|
| 658,493 | 9/1900 | Trigwell. |
| 171,898 | 1/1876 | Wiles. |
| 665,360 | 1/1901 | Beck. |
| 2,773,370 | 12/1956 | Intraub et al. |

FOREIGN PATENTS 980,090  1/1965  Great Britain.

RAMON S. BRITTS, Primary Examiner

U.S. Cl. X.R.
33—199; 85—32; 151—21